(12) United States Patent
Obara et al.

(10) Patent No.: US 10,993,241 B2
(45) Date of Patent: Apr. 27, 2021

(54) WIRELESS COMMUNICATION APPARATUS AND WIRELESS COMMUNICATION METHOD

(71) Applicant: NTT DOCOMO, INC., Tokyo (JP)

(72) Inventors: Tatsunori Obara, Tokyo (JP); Riichi Kudou, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/497,910

(22) PCT Filed: Mar. 31, 2017

(86) PCT No.: PCT/JP2017/013832
§ 371 (c)(1),
(2) Date: Sep. 26, 2019

(87) PCT Pub. No.: WO2018/179432
PCT Pub. Date: Oct. 4, 2018

(65) Prior Publication Data
US 2020/0077410 A1    Mar. 5, 2020

(51) Int. Cl.
*H04W 72/08* (2009.01)
*H04W 76/27* (2018.01)
*H04W 76/38* (2018.01)

(52) U.S. Cl.
CPC ....... *H04W 72/082* (2013.01); *H04W 72/085* (2013.01); *H04W 76/27* (2018.02); *H04W 76/38* (2018.02)

(58) Field of Classification Search
None
See application file for complete search history.

(56) References Cited

U.S. PATENT DOCUMENTS

2004/0069056 A1*  4/2004  Katou ............... B60C 23/0408
                                                              73/146
2007/0105552 A1*  5/2007  Hun ...................... H04W 48/16
                                                              455/434

(Continued)

FOREIGN PATENT DOCUMENTS

JP     2010-050882 A    3/2010

OTHER PUBLICATIONS

International Search Report issued in PCT/JP2017/013832 dated May 9, 2017 (6 pages)

(Continued)

*Primary Examiner* — Lonnie V Sweet
(74) *Attorney, Agent, or Firm* — Osha Bergman Watanabe & Burton LLP

(57) ABSTRACT

In order to prevent wireless resources from becoming scarce in a Sidelink V2X communication, a UE (10) that carries out the Sidelink V2X communication causes: a free resource search unit (105) to search for free resources within a first resource range; a transmission processing unit (107) to transmit a first transmission packet by using the free resources within the first resource range; a transmission inhibition timer unit (108) to set transmission inhibition time which is time for inhibiting start of a second resource range after the transmission of the first transmission packet within the first resource range; and the free resource search unit (105) to search for free resources within the second resource range after the expiration of the transmission inhibition time.

5 Claims, 12 Drawing Sheets

(56) References Cited

U.S. PATENT DOCUMENTS

| | | | | |
|---|---|---|---|---|
| 2008/0247336 | A1* | 10/2008 | Sugitani | H04B 7/2643 370/280 |
| 2012/0254924 | A1* | 10/2012 | Freundlich | C12Q 1/37 725/81 |
| 2012/0258710 | A1* | 10/2012 | Swaminathan | H04W 48/16 455/433 |
| 2015/0131435 | A1* | 5/2015 | Kasslin | H04W 84/12 370/230 |
| 2015/0181619 | A1* | 6/2015 | Kubo | H04W 72/06 370/329 |
| 2015/0318946 | A1* | 11/2015 | Abdelmonem | H04W 72/085 370/252 |

OTHER PUBLICATIONS

Written Opinion of the International Searching Authority issued in PCT/JP2017/013832 dated May 9, 2017 (3 pages).

Hanbyul, S. et al.; "LTE Evolution for Vehicle-to-Everything Services"; LTE-Advanced Pro, vol. 54, No. 6, Jun. 2016, pp. 22-28 (7 pages).

Office Action issued in the counterpart Japanese Patent Application No. 2019-508491, dated Feb. 9, 2021 (7 pages).

NTT Docomo, Inc.; "Evaluation and discussion on resource selection for pedestrian UEs"; 3GPP TSG RAN WG1 Meeting #86, R1-167886; Gothenburg, Sweden; Aug. 22-26, 2016 (7 pages).

* cited by examiner

| PACKET TYPE MANAGEMENT TABLE | | |
|---|---|---|
| TRANSMISSION PACKET TYPE | REAL-TIME PROPERTY | COMMUNICATION RELIABILITY |
| EMERGENCY AVOIDANCE | YES | YES |
| MAIN LINE CONFLUENCE | NO | YES |
| TRANSPORTATION INFORMATION | NO | NO |

FIG. 7

WIRELESS COMMUNICATION APPARATUS AND WIRELESS COMMUNICATION METHOD

TECHNICAL FIELD

The present invention relates to a radio communication apparatus and radio communication method.

BACKGROUND ART

Utilization of vehicle to everything (V2X) communication has been studied for realizing sophistication of Intelligent Transport Systems (ITS) services such as self-driving or traffic accident prevention (for example, see NPL1).

V2X communication includes vehicle-to-vehicle communication (V2V communication), vehicle-to-infrastructure, such as a road side unit installed on a traffic light, sign and/or the like, communication, or vehicle-to-cellular network (network) communication (V2I communication/V2N communication), vehicle-to-pedestrian communication (V2P communication), and/or the like. In addition, direct communication between vehicles without passing through a base station is also referred to as sidelink communication.

Introduction of a new telecommunication scheme for V2X communication has been studied. For example, examples of a communication system used in V2X communication include a wireless LAN such as IEEE802.11p, or a cellular network such as Long Term Evolution (LTE) or the 5th generation mobile communication system (5G).

In sidelink V2X communication, each vehicle (User Equipment (UE)) transmits a packet by using a radio resource with shared time and frequency. Specifically, the UE reserves a resource in a predetermined resource range during generation of a transmission packet, and transmits the packet using the reserved resource.

CITATION LIST

Non-Patent Literature

NPL 1

Hanbyul Seo, Ki-Dong Lee, Shinpei Yasukawa, Ying Peng, Philippe Sartori, "LTE evolution for vehicle-to-everything services," IEEE Communication Magazine, vol. 54, no. 6, pp. 22-28, June 2016.

SUMMARY OF INVENTION

Technical Problem

However, in a case where the UE starts a next resource range before a resource range ends, a large number of resources are used in an overlapping part of the two resource ranges. This may cause a risk of radio resource tightening.

An object of the present invention is to provide a radio communication apparatus and a radio communication method that avoid radio resource tightening in V2X communication.

Solution to Problem

A radio communication apparatus according to an aspect is a radio communication apparatus that transmits a transmission packet to another radio communication apparatus, including: a free resource searcher that searches for free resources in a resource range; a transmission processor that transmits the transmission packet, using a free resource within the resource range; and a transmission prohibition timer that sets a transmission prohibition time to prohibit starting a next resource range after transmission of the transmission packet by the resource range, in which the free resource searcher searches for free resources in the next resource range after expiration of the transmission prohibition time.

Advantageous Effects of Invention

According to the present invention, it is possible to avoid radio resource tightening in V2X communication.

BRIEF DESCRIPTION OF DRAWINGS

FIG. 7 is a table diagram illustrating an example of a packet type management table according to Embodiment 2;

DESCRIPTION OF EMBODIMENTS

Background of Invention

Figure 1:
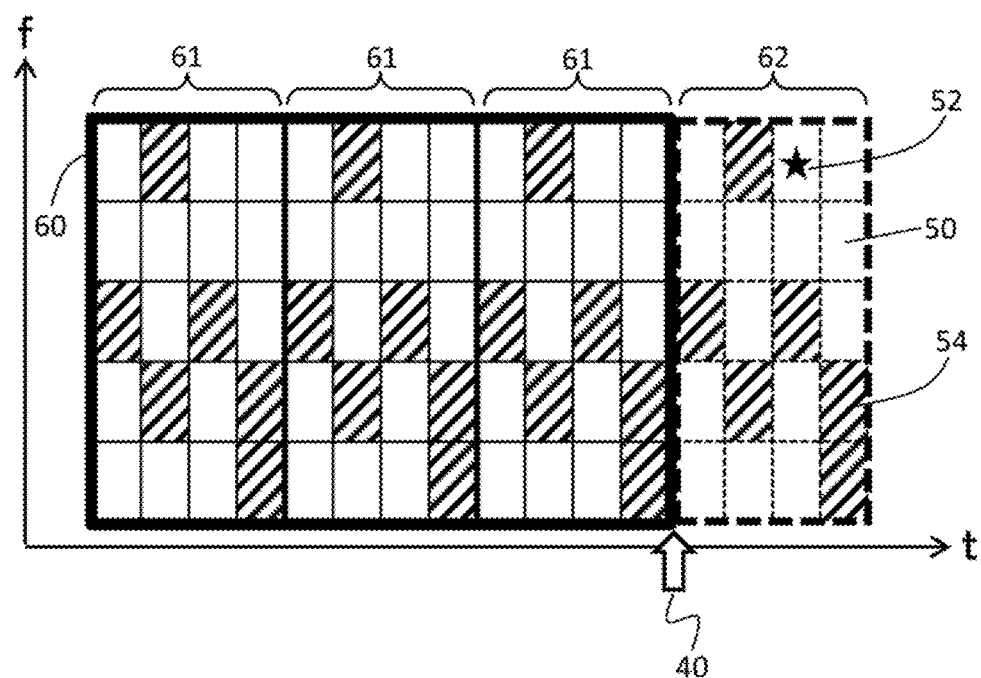
FIG. 1 is a schematic diagram illustrating a configuration example of radio resources in V2X communication.

Hereinafter, a packet transmission processing of a UE in sidelink V2X communication will be described. FIG. 1 shows a configuration example of radio resources in V2X communication. Here, resource block 50 is a resource assignment unit composed of time domain t and frequency domain f. Resource selection windows 61 and 62 composed of predetermined width in the time domain and predetermined width in the frequency domain in radio resources are predefined in the UE.

As shown in FIG. 1, the UE senses sensing window 60 made up of a plurality of past resource selection windows 61 at timing 40 when a transmission packet is generated, calculates an amount of interference at each time and frequency, selects a free resource with little interference in future resource selection window 62, and reserves it at any appropriate cycle. The UE then transmits the transmission packet using reserved resource 52. Hereinafter, the reserved resource is referred to as "reservation resource."

Figure 2:
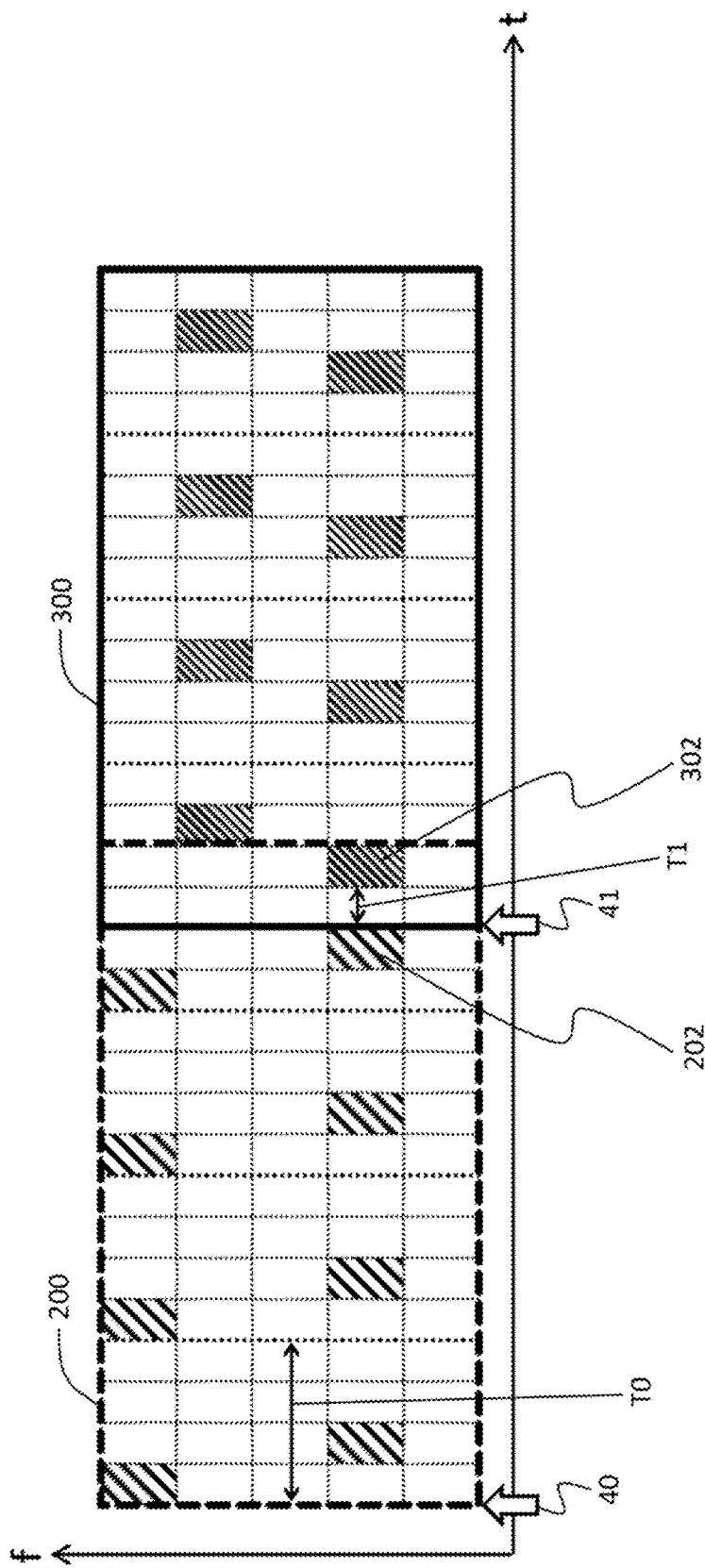
FIG. 2 is a schematic diagram illustrating an example of resource selection window overlapping.

In this case, in a case where timing 41 at which a second transmission packet is generated is within first resource selection window 200 for a first transmission packet, as shown in FIG. 2, first resource selection window 200 overlaps with second resource selection window 300 for the second transmission packet. In other words, time interval T1 between last reservation resource 202 in first resource selection window 200 and first reservation resource 302 in second resource selection window 300 becomes shorter than minimum time T0 (for example, 20 ms) settable to resource selection windows. This corresponds to the fact that one UE uses more radio resources than other UEs within a predetermined time, and eventually leads to radio resource tightening.

The inventor has paid attention to this point and made the present invention. The invention is mainly characterized by setting transmission prohibition time, time to prohibit setting second resource selection window 300 for transmitting a next second transmission packet after transmission of a first transmission packet by first resource selection window 200 in V2X communication, and thereby avoiding such radio resource tightening. In addition, the range of a resource selection window may be referred to as "resource range."

Hereinafter, several embodiments will be described in detail with reference to the accompanying drawings.

Embodiment 1

Configuration of UE

Figure 3:
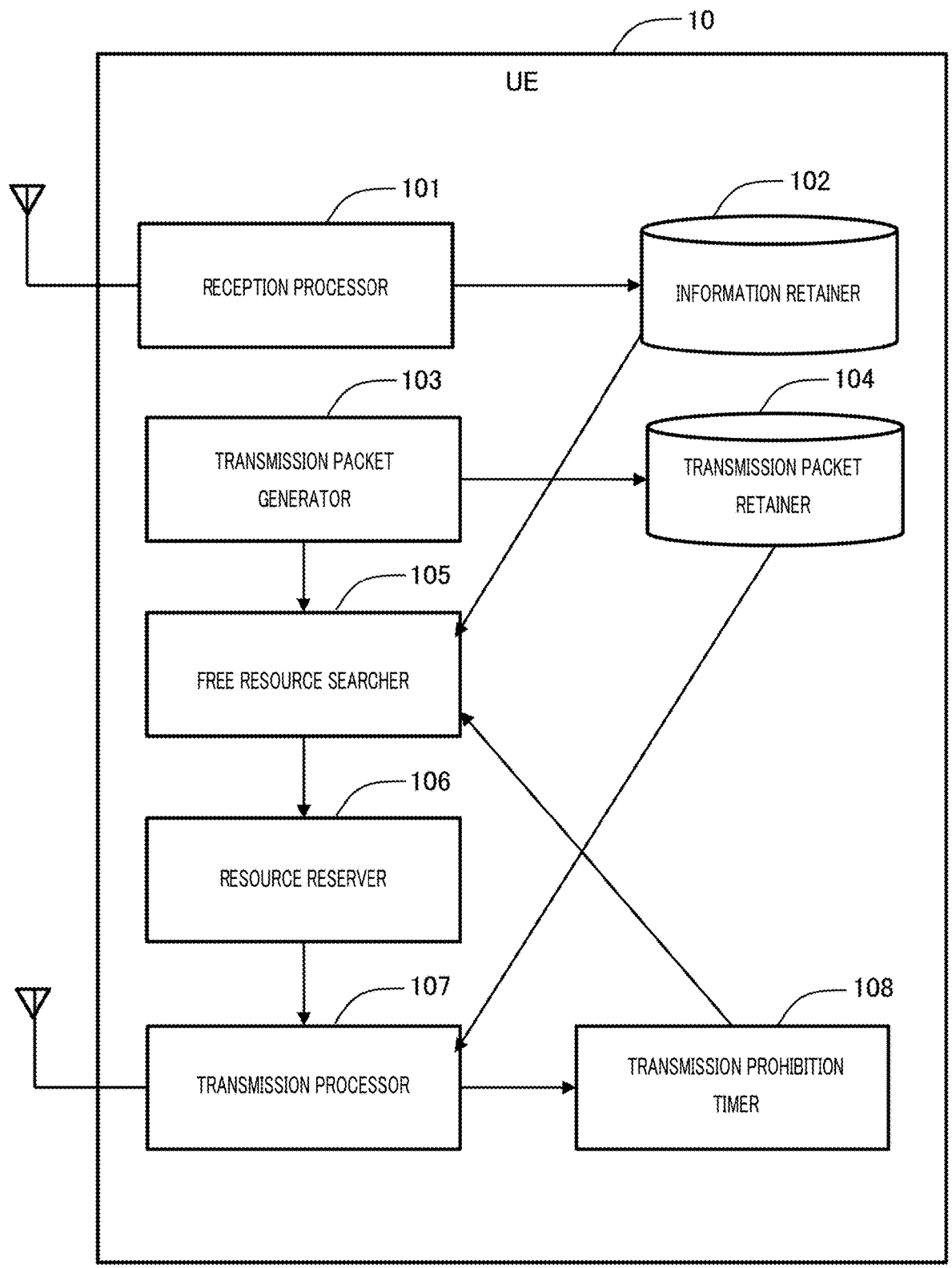
FIG. 3 is a block diagram illustrating a configuration example of a radio communication apparatus according to Embodiment 1.

Hereinafter, a functional configuration of a UE which is an example of a radio communication apparatus according to Embodiment 1 will be described with reference to FIG. 3. FIG. 3 is a block diagram illustrating a configuration example of functions of the UE.

UE 10 includes reception processor 101, information retainer 102, transmission packet generator 103, transmission packet retainer 104, free resource searcher 105, resource reserver 106, transmission processor 107, and transmission prohibition timer 108.

Reception processor 101 receives, via an antenna, a signal transmitted using resource block 50 from another UE and stores a received power value of the received signal in infatuation retainer 102. In addition, reception processor 101 decodes the received signal to extract a packet, extracts control information from the packet, and stores the control information in information retainer 102.

Information retainer 102 retains the received power value and control info !nation for a predetermined period. The period when information retainer 102 retains the information corresponds to, for example, time length of sensing window 60 (see FIG. 1) in which free resource searcher 105 searches for a free resource block.

Transmission packet generator 103 generates a packet to be transmitted to the other UE and stores it in transmission packet retainer 104. Transmission packet generator 103 then instructs free resource searcher 105 to transmit the generated transmission packet.

Upon receiving the transmission instructions from transmission packet generator 103, free resource searcher 105 senses within a range of sensing window 60 for the information retained by information retainer 102, and searches for free resources. Free resource searcher 105 then hands over information on the free resources detected as a result of the search to resource reserver 106. Furthermore, time width of sensing window 60 is, for example, 1,000 milliseconds. Free resource searcher 105 analyzes an interference pattern of power on the basis of received power of the received signal within sensing window 60, and thereby determines whether each resource block 50 is a free resource block or occupied resource block 54. Also, free resource searcher 105 identifies another UE occupying occupied resource block 54 on the basis of control information (specifically, resource reservation information) included in a received packet within sensing window 60. The resource reservation information is information indicating a reservation situation of resource block 50.

Free resource searcher 105 confirms whether a transmission prohibition timer is running or not in transmission prohibition timer 108 at the time of starting searching for free resources, and does not start searching for free resources even in a case where transmission instructions are received from transmission packet generator 103 while the transmission prohibition timer is running (for example, until the transmission prohibition timer becomes 0).

Upon receiving the information on free resources from free resource searcher 105, resource reserver 106 reserves at least one free resource for transmission of a transmission packet from the received free resources within future resource selection window 62.

Transmission processor 107 transmits the transmission packet by using the reservation resource within future resource selection window 62. Transmission processor 107 may repeat transmission of the same transmission packet multiple times (for example, 5-15 times) in order to increase communication reliability.

Figure 4:
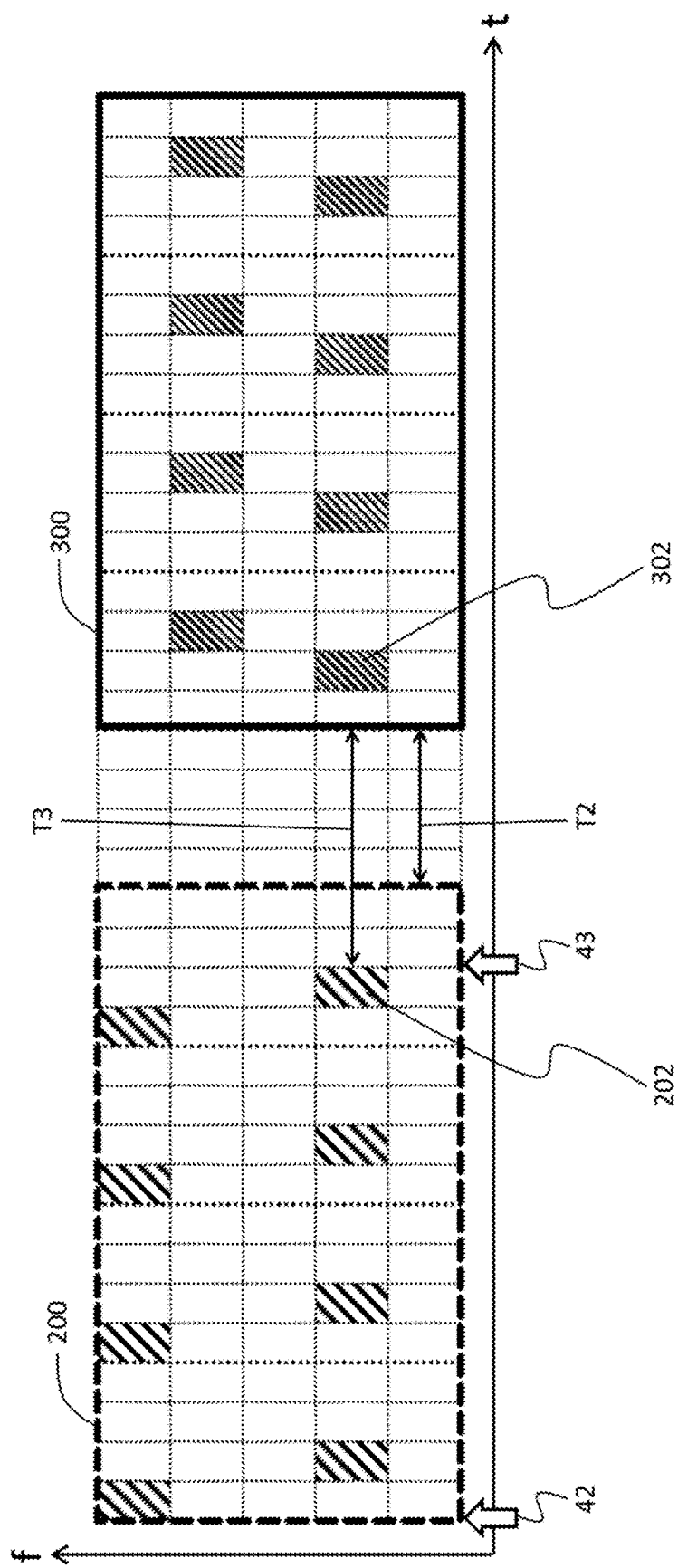
FIG. 4 is a schematic diagram for explaining a transmission prohibition time according to Embodiment 1.

Transmission prohibition timer 108 starts the transmission prohibition timer after transmission processor 107 finishes transmitting the transmission packet, and counts for transmission prohibition time. Details of transmission prohibition timer 108 will be described below with reference to FIG. 4. FIG. 4 is a schematic diagram for explaining the transmission prohibition time.

Details of Transmission Prohibition Timer

As shown in FIG. 4, transmission prohibition timer 108 starts a timer for the transmission prohibition time to prohibit setting second resource selection window 300 after transmitting the first transmission packet by first resource selection window 200.

The transmission prohibition time may be time T2 from the end of first resource selection window 200 to the beginning of second resource selection window 300. In this case, transmission prohibition timer 108 starts the transmission prohibition timer for transmission prohibition time T2 at the end of resource selection window 200. Free resource searcher 105 does not start free resource search while the transmission prohibition timer in transmission prohibition timer 108 is running even in a case where timing 43 when transmission instructions on the second transmission packet are received is within a range of first resource selection window 200, and starts free resource search after the operation time of the transmission prohibition timer ends (expires) (for example, the transmission prohibition timer becomes 0).

Alternatively, the transmission prohibition time may be time T3 from last reservation resource 202 of first resource selection window 200 to the beginning of second resource selection window 300. In this case, transmission prohibition timer 108 starts the transmission prohibition timer for transmission prohibition time T3 after finishing a transmission processing by last reservation resource 202. Free resource searcher 105 does not start free resource search while the transmission prohibition timer in transmission prohibition timer 108 is running even in a case where timing 43 at which transmission instructions on the second transmission packet are received is within the range of first resource selection window 200, and starts free resource search after the operation time of the timer ends.

This can prevent first resource selection window 200 from overlapping with second resource selection window 300.

Flow of Packet Transmission Processing

Figure 5:
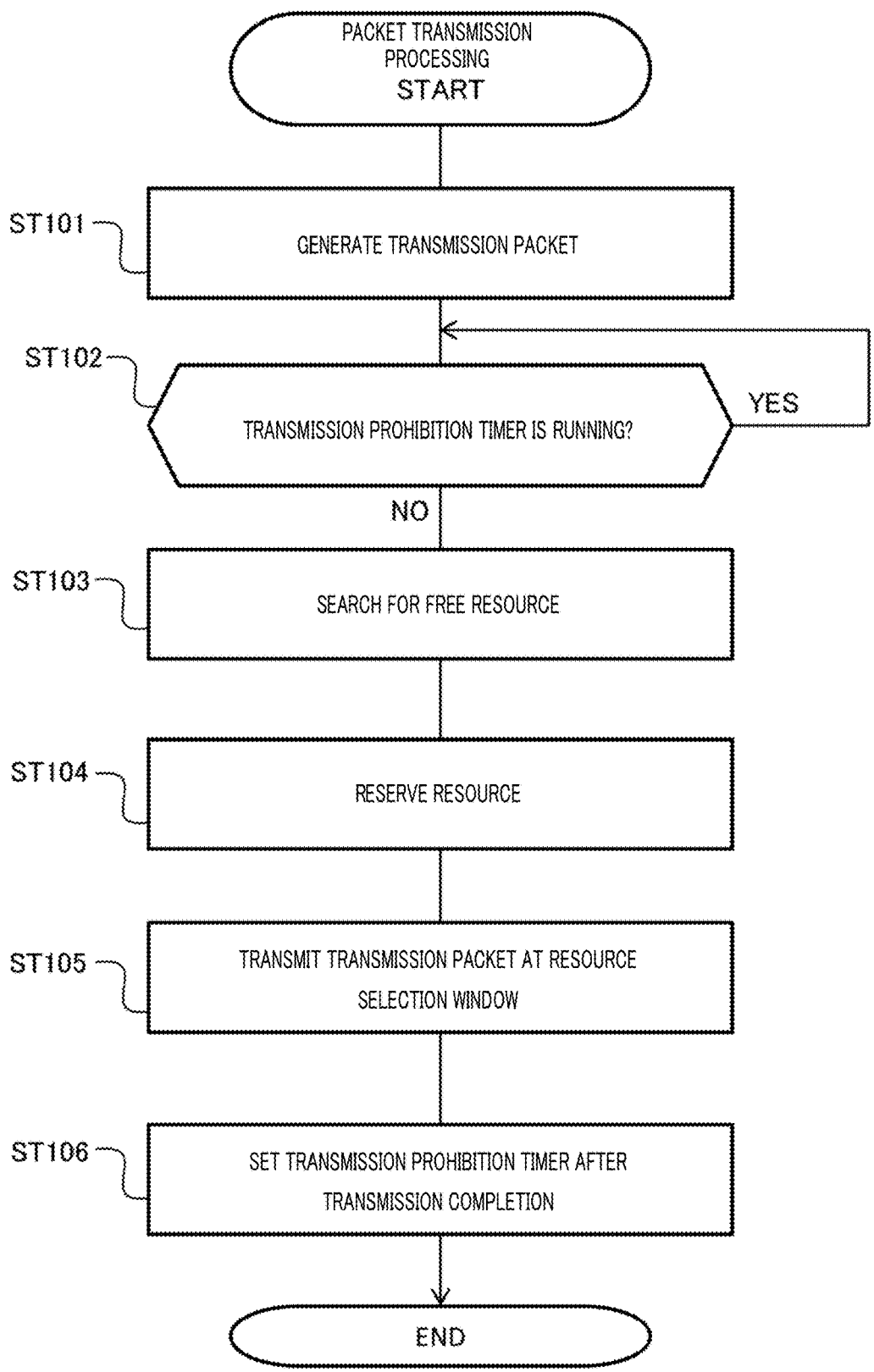
FIG. 5 is a flowchart illustrating an example of a packet transmission processing according to Embodiment 1.

Next, a flow of the packet transmission processing in which the transmission prohibition time is provided will be described with reference to FIG. 5. FIG. 5 is a flowchart illustrating an example of a packet transmission processing according to Embodiment 1.

Transmission packet generator 103 generates a transmission packet to store it in transmission packet retainer 104, and instructs free resource searcher 105 to transmit the generated transmission packet (ST101).

Upon receiving the transmission instructions, free resource searcher 105 waits while the transmission prohibition timer is running (ST102: YES).

Free resource searcher 105 starts a free resource search processing as described above (ST103) in a case where the operation of the transmission prohibition timer has ended (ST102: NO).

When resource reserver 106 receives information on free resources from free resource searcher 105, it reserves at least one free resource for transmission of the transmission packet from the received free resources within the future resource selection window (ST104).

When transmission processor 107 receives the information reservation resources from resource reserver 106, it uses the reservation resource within the future resource selection window to transmit the transmission packet stored in transmission packet retainer 104 (ST105).

Transmission processor 107 instructs transmission prohibition timer 108 to set the transmission prohibition timer after finishing transmitting the transmission packet. Upon receiving the instructions, transmission prohibition timer 108 starts the transmission prohibition timer in which transmission prohibition time T2 (or T3) is set (ST106). The transmission prohibition timer started here serves as a condition of ST102 for a transmission packet to be generated next.

The above-described processing makes it possible to prevent overlapping of two resource selection windows.

Variation of Embodiment 1

According to the above-described explanation, after transmission packet generator 103 generates a transmission packet, free resource searcher 105 determines whether the transmission prohibition timer is running or not, but this embodiment is not limited to this, and transmission packet generator 103 may determine whether the transmission prohibition timer is running or not. That is, transmission packet generator 103 determines whether the transmission prohibition timer is running or not, and in a case where the transmission prohibition timer is running, suspends generation of a transmission packet, then generates the transmission packet after end of operation of the transmission prohibition timer, and gives free resource searcher 105 transmission instructions. Upon receiving the transmission instructions, free resource searcher 105 starts the free resource search processing. This also makes it possible to prevent overlapping of resource selection windows.

Effects of Embodiment 1

As described above, in Embodiment 1, UE 10 prohibits setting of second resource selection window 300 for the next second transmission packet during the transmission prohibition time after transmission of the first transmission packet by first resource selection window 200. This allows radio resource tightening in V2X communication to be avoided.

It is also possible to prevent one UE from reserving more resources than other UEs in a predetermined time. This allows a plurality of UEs to use radio resources more fairly.

Embodiment 2

In Embodiment 2, a form for controlling transmission prohibition according to a transmission packet type will be described.

Configuration of UE

Figure 6:
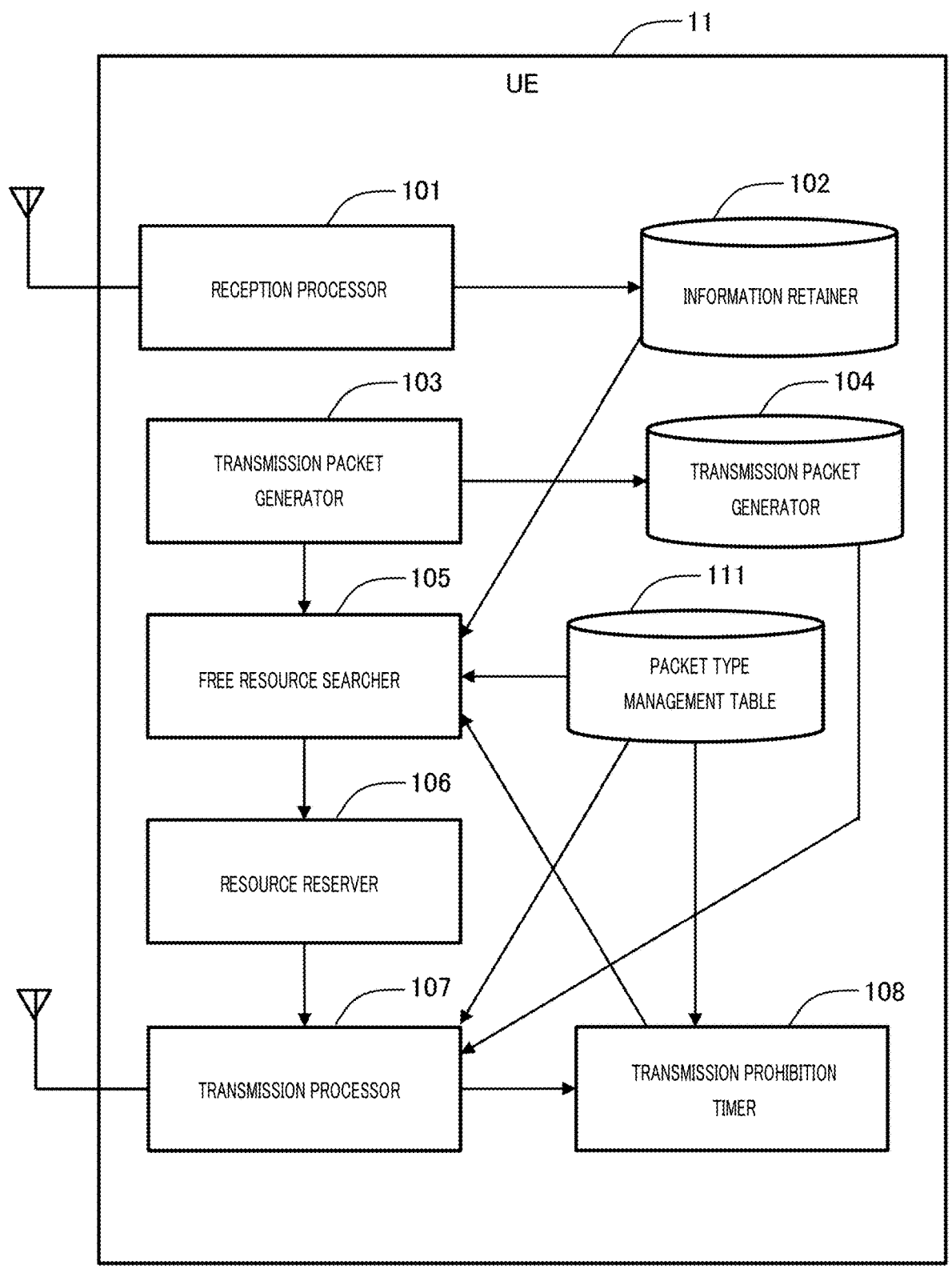
FIG. 6 is a block diagram illustrating a configuration example of a radio communication apparatus according to Embodiment 2.

A functional configuration of a UE, an example of a radio communication apparatus according to Embodiment 2 will be described below with reference to FIG. 6. FIG. 6 is a block diagram illustrating a configuration example of functions of UE 11. In addition, functions similar to Embodiment 1 will be given the same reference symbols and explanation will be omitted.

UE 11 according to Embodiment 2 adopts a configuration in which packet type management table 111 is added in comparison with UE 10 according to Embodiment 1.

Packet type management table 111 is a table for managing whether high real-time property is required or not and whether high communication reliability is required or not for each of transmission packet types, as shown in FIG. 7. The example of FIG. 7 indicates that a transmission packet type to give notice of "emergency avoidance" requires high real-time property and also requires high communication reliability. In addition, it indicates that a transmission packet type to give notice of "main line confluence" does not require high real-time property but requires high communication reliability. It also indicates that a transmission packet type to give notice of "transportation information" requires neither high real-time property nor high communication reliability.

Free resource searcher 105 has the following function in addition to the functions described in Embodiment 1. That is, in a case where the type of the transmission packet requires real-time property, free resource searcher 105 starts free resource search even when the transmission prohibition timer is running. This makes it possible to prevent transmission of a transmission packet requiring real-time property from being delayed due to the transmission prohibition timer.

Transmission processor 107 has the following function in addition to the functions described in Embodiment 1. That is, transmission processor 107 changes a repeat transmission number of a transmission packet according to a type of the transmission packet. For example, in a case where the type of the transmission packet requires high communication reliability, transmission processor 107 increases the repeat transmission number of the transmission packet. This makes it possible to improve a probability that the transmission packet will reach another UE.

Figure 8:
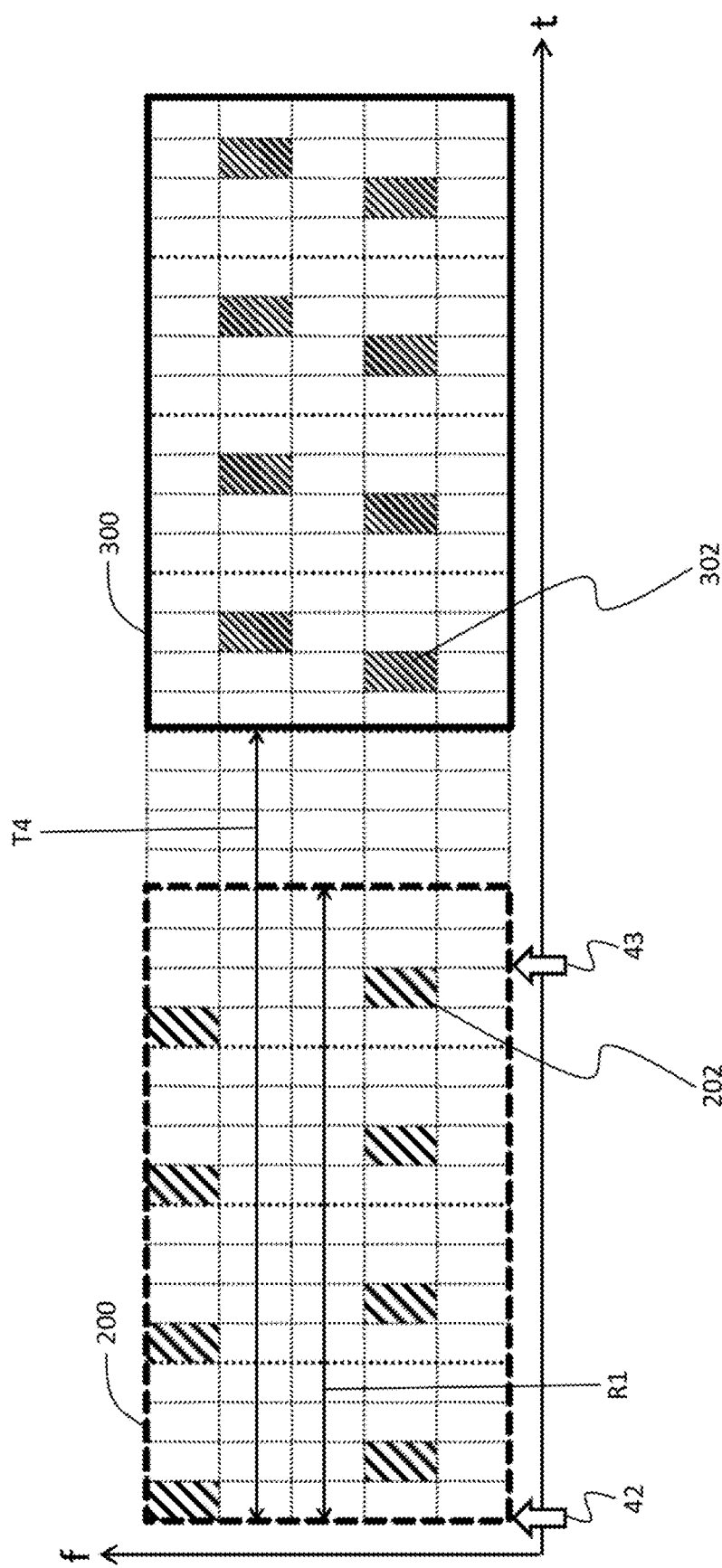
FIG. 8 is a schematic diagram for explaining a transmission prohibition time according to Embodiment 2.

Transmission prohibition timer 108 has the following function in addition to the functions described in Embodiment 1. That is, transmission prohibition timer 108 determines the transmission prohibition time according to a type of transmission packet. Details of transmission prohibition timer 108 will be described below with reference to FIG. 8. FIG. 8 is a schematic diagram for explaining a transmission prohibition time according to Embodiment 2.

Details of Transmission Prohibition Timer 108

In Embodiment 2, a start point of transmission prohibition time T4 is made timing 42 when a first transmission packet is generated, as shown in FIG. 8. In this case, transmission prohibition timer 108 can prevent first resource selection window 200 from overlapping with second resource selection window 300 by making transmission prohibition time T4 to time R1 or more in first resource selection window 200.

In addition, transmission prohibition timer 108 can allow first resource selection window 200 and second resource selection window 300 to overlap in a range (R1-T4) by making transmission prohibition time T4 to less than time R1 in first resource selection window 200. For example, when there are sufficient free radio resources as a result of sensing for sensing window 60, transmission prohibition timer 108 makes transmission prohibition time T4 shorter than time R1, and may allow first resource selection window 200 and second resource selection window 300 to overlap.

In a case where the type of the transmission packet requires high communication reliability although it does not require high real-time property, transmission prohibition timer 108 makes transmission prohibition time T4 longer than a standard (for example, time exceeding 1 second), and transmission processor 107 may repeat transmission of the same transmission packet at intervals of transmission prohibition time T4. This allows the communication reliability of the transmission packet to be increased while preventing one UE 11 from occupying the radio resources.

Flow of Packet Transmission Processing

Figure 9:
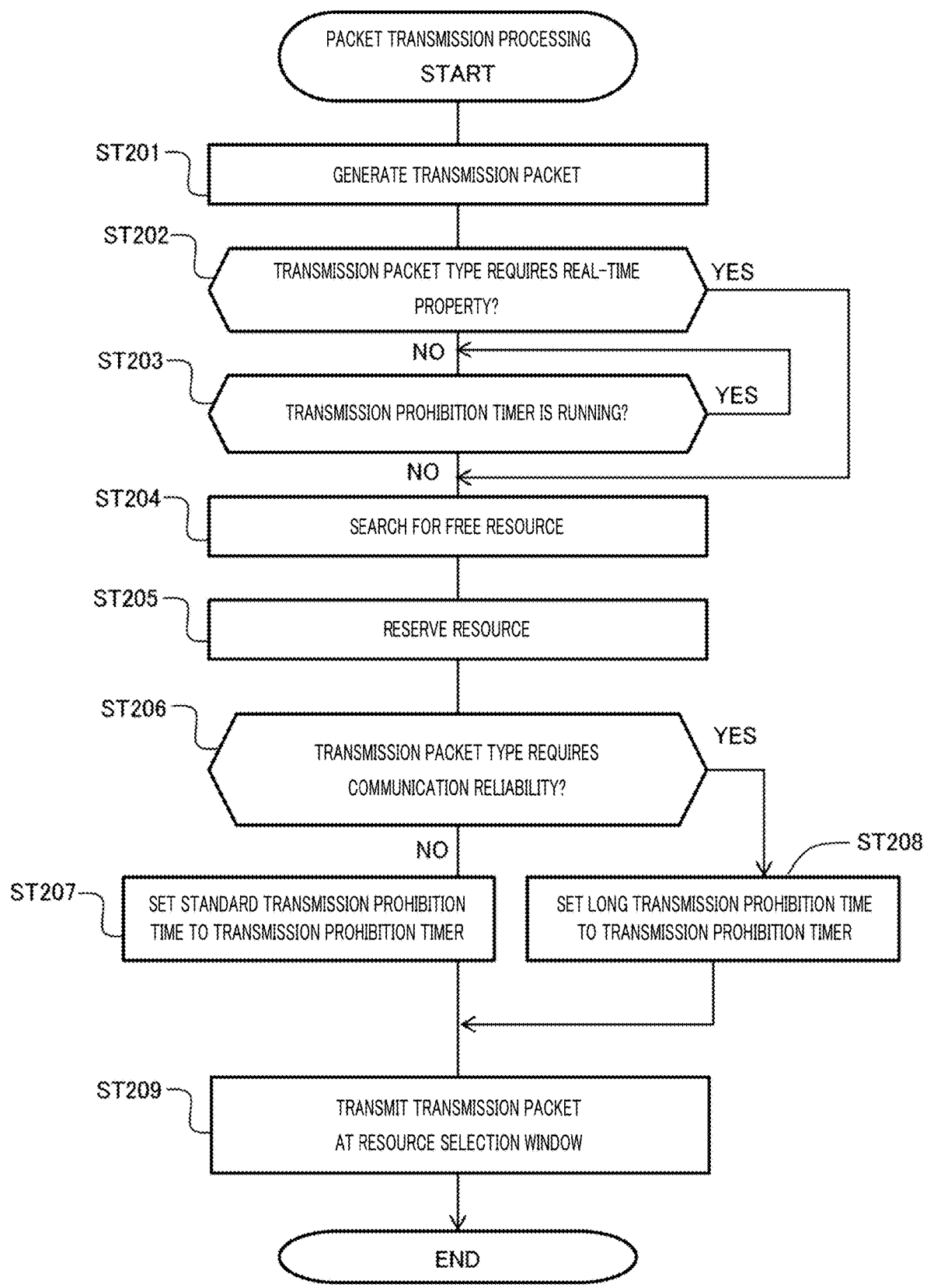
FIG. 9 is a flowchart illustrating an example of a packet transmission processing according to Embodiment 2.

Next, a flow of the packet transmission processing to control transmission prohibition according to the type of the transmission packet will be described with reference to FIG. 9. FIG. 9 is a flowchart illustrating an example of the packet transmission processing according to Embodiment 2.

Transmission packet generator 103 generates a transmission packet to store it in transmission packet retainer 104, and instructs free resource searcher 105 to transmit the generated transmission packet (ST201).

Upon receiving the transmission instructions, free resource searcher 105 uses packet type management table 111 to determine whether the type of the transmission packet requires real-time property or not (ST202).

In a case where the type of transmission packet does not require real-time property (ST202: NO), free resource searcher 105 waits until operation of the transmission prohibition timer ends (ST203: YES) and then starts a free resource search processing (ST204) after the operation of the transmission prohibition timer ends (ST203: NO).

On the other hand, in a case where the type of transmission packet requires real-time property (ST202: YES), free resource searcher 105 starts the free resource search processing (ST204) regardless of operation of the transmission prohibition timer. This makes it possible to prevent a transmission packet requiring real-time property from being delayed.

When resource reserver 106 receives information on free resources from free resource searcher 105, it reserves at least one free resource for transmission of the transmission packet from the received free resources within the future resource selection window (ST205).

When transmission processor 107 receives information on the reservation resource from resource reserver 106, it instructs transmission prohibition timer 108 to start the transmission prohibition timer. Upon receiving the instructions, transmission prohibition timer 108 uses packet type management table 111 to determine whether the type of the transmission packet requires high communication reliability or not (ST206).

In a case where the type of the transmission packet does not require high communication reliability (ST206: NO), transmission prohibition timer 108 starts the transmission prohibition timer in which standard transmission prohibition time T4 is set (ST207).

On the other hand, in a case where the type of the transmission packet requires high communication reliability (ST206: YES), transmission prohibition timer 108 starts the transmission prohibition timer in which transmission prohibition time T4 longer than the standard is set (ST208). The reason to set the transmission prohibition time longer than the standard is to avoid a state in which one UE repeats transmission of the same transmission packet at short intervals and occupies the resources, as described above.

Transmission processor 107 transmits the transmission packet by using the resource selection window (ST209). In a case where the type of the transmission packet requires high communication reliability, transmission processor 107 may transmit the same transmission packet after the elapse of the long transmission prohibition time set at ST208.

According to the above-described processing, it is possible to transmit a transmission packet requiring real-time property without delay. In addition, it is possible to avoid a state in which a UE repeating transmission of the same transmission packet for increasing communication reliability occupies the radio resources.

Variation of Transmission Prohibition Time

The transmission prohibition time may be a value different for each UE, or may be the same value regardless of the UE. In addition, regarding the transmission prohibition time, each UE may determine it as in the embodiment, or a base station (eNode B) may determine it and report it to each UE.

Application Example of Sidelink V2X Communication

Next, an application example to a vehicle equipped with UE 10 according to the embodiment will be described with reference to FIGS. 10 and 11.

Figure 10:
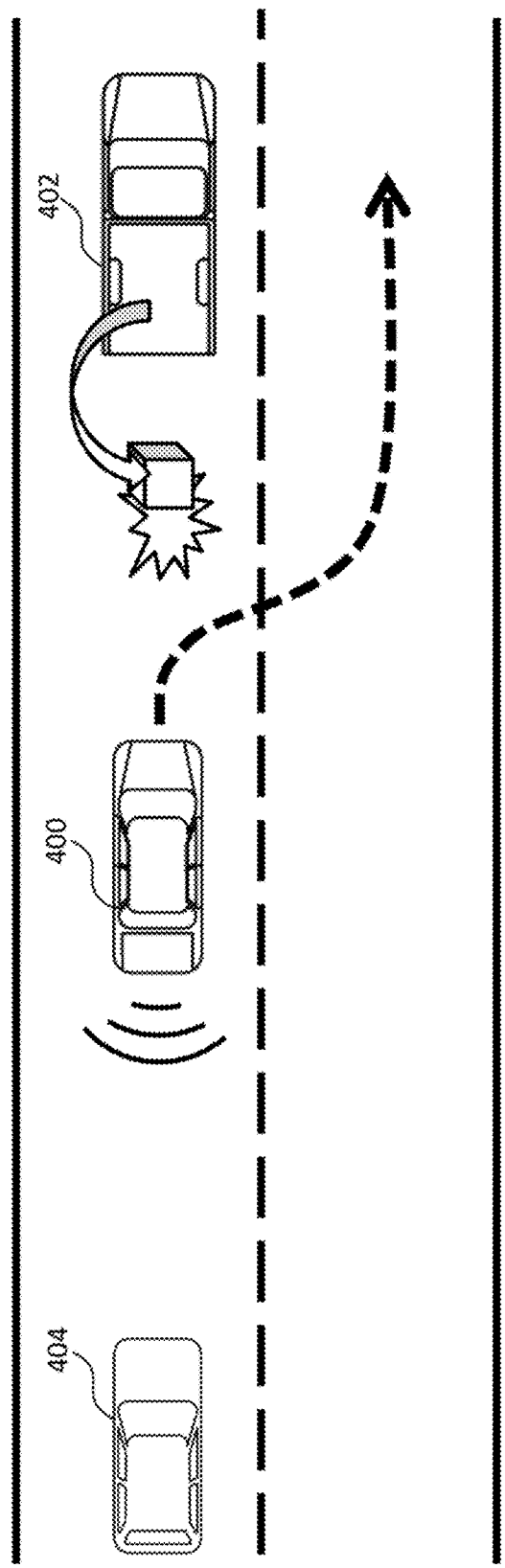
FIG. 10 is a schematic diagram illustrating an application example of sidelink V2X communication according to Embodiment 2.

In a case where an object that fell from truck 402 running in front of vehicle 400 is detected, as shown in FIG. 10, UE 11 in vehicle 400 sends UEs in following vehicles 404 and/or the like a packet to give notice of emergency evasive action. Because this type of transmission packet requires high real-time property, ST202 in FIG. 9 becomes YES, free resource searcher 105 of UE 11 in vehicle 400 ignores the transmission prohibition timer, and starts searching for free resources at ST204. This makes it possible to prevent a transmission packet requiring high real-time property from being delayed due to the transmission prohibition timer.

Figure 11:
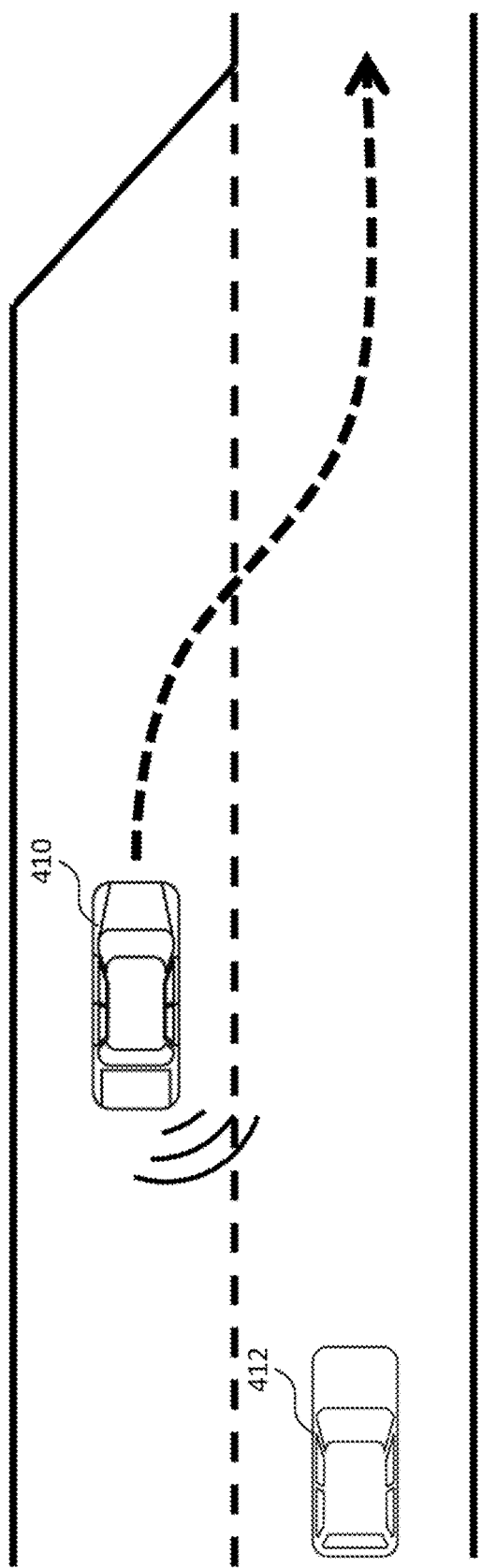
FIG. 11 is a schematic diagram illustrating an application example of sidelink V2X communication according to Embodiment 2.

As shown in FIG. 11, UE 11 in vehicle 410 running on a confluence lane transmits a packet to give notice of confluence action to UEs in other vehicles 412 and/or the like running on a main line. Because this type of transmission packet requires high communication reliability, ST206 in FIG. 9 becomes YES, transmission prohibition timer 108 of UE 11 in vehicle 410 sets a long transmission prohibition period to the transmission prohibition timer at ST208. This makes it possible for a transmission packet requiring high communication reliability to reach other UEs with higher probability and also makes it possible to prevent UE 11 from occupying the radio resources.

Effects of Embodiment 2

As described above, in Embodiment 2, UE11 controls transmission prohibition according to the type of transmission packet. That is, UE 11 immediately transmits a transmission packet requiring real-time property ignoring the transmission prohibition timer. For a transmission packet requiring high communication reliability, UE11 lengthens the transmission prohibition time in repeat transmission and thereby prevents its occupying the radio resources. This can achieve both avoidance of radio resource tightening and flexible operation of V2X communication in sidelink V2X communication.

Hardware Configuration

Note that the block diagrams used to describe the embodiments illustrate blocks on the basis of functions. These functional blocks (constituent sections) are implemented by any combination of hardware and/or software. A means for realizing the functional blocks is not particularly limited. That is, the functional blocks may be implemented by one physically and/or logically coupled apparatus. Two or more physically and/or logically separated apparatuses may be directly and/or indirectly (for example, wired and/or wireless) connected, and the plurality of apparatuses may implement the functional blocks.

Figure 12:
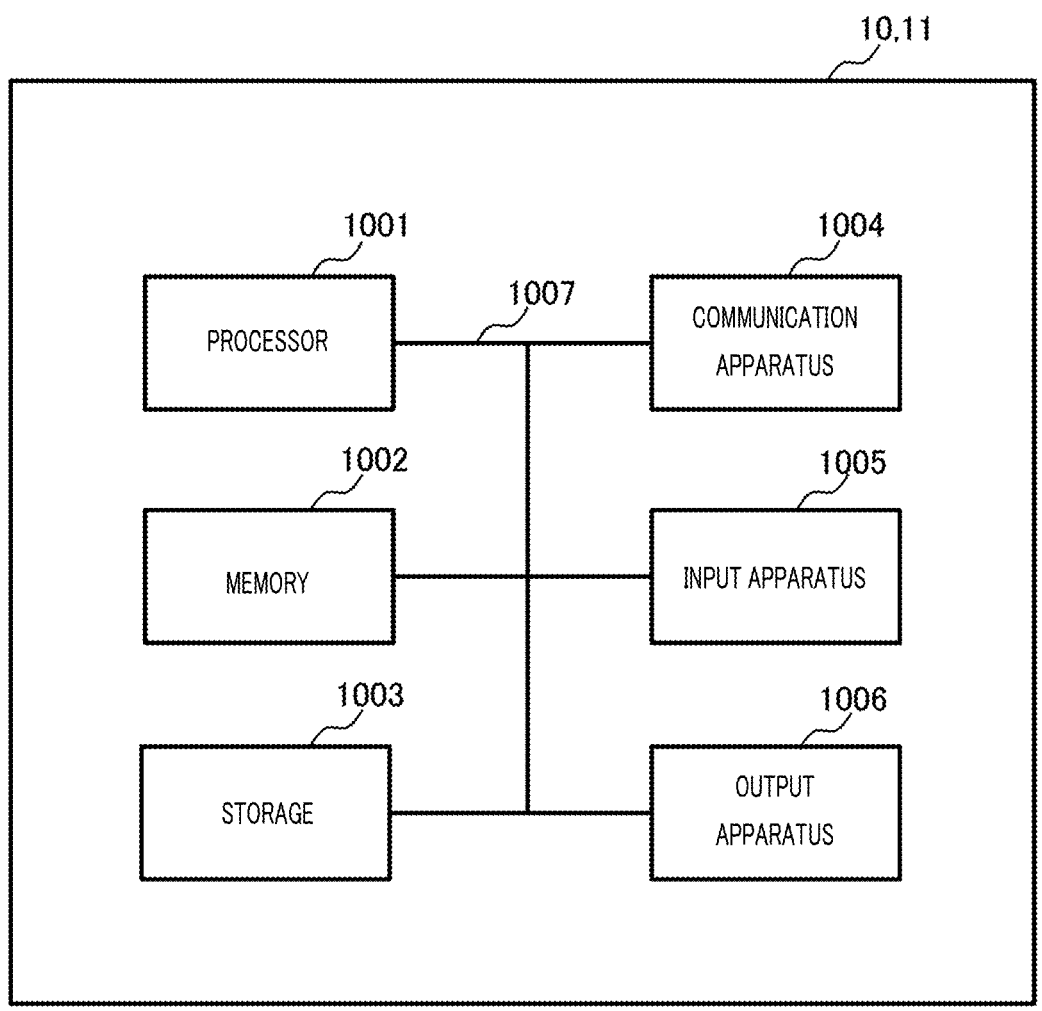
FIG. 12 is a diagram illustrating a hardware configuration example of a user equipment (UE) according to the present invention.

For example, the radio base station, the user terminal, and/or the like, according to an embodiment of the present invention may function as computers which perform processing of the radio communication method of the present invention. FIG. 12 illustrates an example of hardware configurations of the user equipment (UE) according to an embodiment of the present invention. The above-described user equipments 10 and 11 may be physically configured as a computer apparatus including processor 1001, memory 1002, storage 1003, communication apparatus 1004, input apparatus 1005, output apparatus 1006, bus 1007, and/or the like.

Note that the twin "apparatus" in the following description can be replaced with a circuit, a device, a unit, and/or the like. The hardware configurations of user equipments 10 and 11 may include one or a plurality of apparatuses illustrated in the drawings or may not include part of the apparatuses.

The functions in user equipments 10 and 11 are implemented by predetermined software (program) loaded into hardware, such as processor 1001, memory 1002, and/or the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and/or the like. For example, processor 1001 may implement the above-described sections such as reception processor 101, transmission packet generator 103, free resource searcher 105, resource reserver 106, transmission processor 107, and transmission prohibition timer 108.

Processor 1001 reads out a program (program code), a software module, or data from storage 1003 and/or communication apparatus 1004 to memory 1002 and executes various types of processing according to the read-out program and/or the like. The program used is a program for causing the computer to execute at least part of the operation described in the embodiments. For example, the functions of user equipments 10 and 11 may be implemented by a control program stored in memory 1002 and operated by processor 1001. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), and/or the like. Memory 1002 can save a program (program code), a software module, and/or the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003. For example, memory 1002 and/or storage 1003 may implement above-described information retainer 102, transmission packet retainer 104, and packet type management table 111.

Communication apparatus 1004 is hardware (transmission and reception device) for communication between computers through a wired and/or wireless network and is also called, for example, a network device, a network controller, a network card, or a communication module. For example, reception processor 101, transmission processor 107, and/or the like, as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, user equipments 10 and 11 may include hardware, such as a microprocessor, a digital signal processor (DSP), an ASIC (Application Specific Integrated Circuit), a PLD (Programmable Logic Device), and an FPGA (Field Programmable Gate Array), and the hardware may implement part or all of the functional blocks. For example, processor 1001 may be implemented by at least one of these pieces of hardware.

Determination Method

The determination may be made based on a value expressed by one bit (0 or 1), based on a Boolean value (true or false), or based on comparison with a numerical value (for example, comparison with a predetermined value).

Variations and/or the Like of Aspects

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

Meaning and Interpretation of Terms

Software

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and/or the like.

The software, the instruction, and/or the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

Information and Signals

The information, the signals, and/or the like described in the present specification may be expressed by using any of various different techniques. For example, data, instructions, commands, information, signals, bits, symbols, chips, and/or the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, and/or the like.

"System" and "Network"

The terms "system" and "network" used in the present specification can be interchangeably used.

Names of Parameters and Channels

The information, the parameters, and/or the like described in the present specification may be expressed by absolute values, by values relative to predetermined values, or by other corresponding information. For example, radio resources may be indicated by indices.

The names used for the parameters are not limited in any respect. Furthermore, the numerical formulas and/or the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

Base Station

The base station can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station," "eNB," "cell," and "sector" can be interchangeably used in the present specification. The base station may be called a fixed station, a NodeB, an eNodeB (eNB), an access point, a femto cell, a small cell, and/or the like.

Mobile Station

The mobile station may be called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, or a client, or by some other appropriate terms.

"Connected" and "Coupled"

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

Reference Signal

The reference signal can also be abbreviated as RS and may also be called a pilot depending on the applied standard.

Meaning of "Based On"

The description "based on" used in the present specification does not mean "based only on," unless otherwise specifically stated. In other words, the description "based on" means both of "based only on" and "based at least on."

"First" and "Second"

Any reference to elements using designations such as "first" and "second" used in the specification does not generally limit amounts or order of the elements. The designations can be used in the specification as a convenient method to distinguish two or more elements. Therefore, reference to first and second elements does not mean that only two elements can be adopted there or the first element has to precede the second element in any kind of way.

Means

The "means" in the configuration of each apparatus may be replaced with "section," "circuit," "device," and/or the like.

Open-Ended Phrases

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

Time Unit of TTI and/or the Like and Radio Frame Configuration

The radio frame may be constituted by one frame or a plurality of frames in the time domain. The one frame or each of the plurality of frames may be called a subframe in the time domain. The subframe may be further constituted by one slot or a plurality of slots in the time domain. The slot may be further constituted by one symbol or a plurality of symbols (OFDM symbol, SC-FDMA symbol, and/or the like) in the time domain. The radio frame, the subframe, the slot, and the symbol indicate time units in transmitting signals. The radio frame, the subframe, the slot, and the symbol may be called by other corresponding names For example, in the LTE system, the base station creates a schedule for assigning radio resources to each mobile station (such as frequency bandwidth that can be used by each mobile station and transmission power). The minimum time unit of scheduling may be called a TTI (Transmission Time Interval). For example, one subframe, a plurality of continuous subframes, or one slot may be called a TTI. The resource block (RB) is a resource assignment unit in the time domain and the frequency domain, and the resource unit may include one subcarrier or a plurality of continuous subcarriers in the frequency domain. In addition, the resource block may include one symbol or a plurality of symbols in the time domain, and may have a length of one slot, one subframe, or one TTI. One TTI and one subframe may be constituted by one resource block or a plurality of resource blocks. The structure of the radio frame described above is illustrative only, and the number of subframes included in the radio frame, the number of slots included in the subframe, the numbers of symbols and resource blocks included in the slot, and the number of subcarriers included in the resource block can be changed in various ways.

Maximum Transmission Power

"Maximum transmission power" described in the embodiments means a maximum value of transmission power, but not only this, and may be, for example, the nominal UE maximum transmit power or the rated UE maximum transmit power.

Articles

When articles, such as "a," "an," and "the" in English, are added by translation in the entire disclosure, the articles include plural forms unless otherwise clearly indicated by the context.

REFERENCE SIGNS LIST

10, 11 UE
101 Reception processor
102 Information retainer
103 Transmission packet generator
104 Transmission packet retainer
105 Free resource searcher
106 Resource reserver
107 Transmission processor
108 Transmission prohibition timer
111 Packet type management table

The invention claimed is:

1. A radio communication apparatus that transmits a transmission packet to another radio communication apparatus, comprising:
   a free resource searcher that searches for free resources in a resource range;
   a transmission processor that transmits the transmission packet, using a free resource within the resource range; and
   a transmission prohibition timer that sets a transmission prohibition time to prohibit starting a next resource range after transmission of the transmission packet by the resource range,
   wherein the free resource searcher searches for free resources in the next resource range after expiration of the transmission prohibition time, and
   wherein the free resource searcher searches for free resources in the next resource range even before the transmission prohibition time expires in a case where a type of the transmission packet requires real-time property.

2. The radio communication apparatus according to claim 1, wherein, for the transmission prohibition time, a time length in which the resource range used for transmission of the transmission packet and a start point of the next resource range do not overlap each other is set.

3. The radio communication apparatus according to claim 1, wherein the transmission prohibition timer permits lengthening setting of the transmission prohibition time in a case where a type of the transmission packet requires communication reliability.

4. The radio communication apparatus according to claim 2, wherein the transmission prohibition timer permits lengthening setting of the transmission prohibition time in a case where a type of the transmission packet requires communication reliability.

5. A radio communication method of transmitting a transmission packet to another radio communication apparatus, the method comprising:
  searching for free resources in a first resource range;
  transmitting a first transmission packet, using a free resource within the first resource range;
  setting a transmission prohibition time to prohibit starting a second resource range after transmission of the first transmission packet by the first resource range;
  searching for free resources in the second resource range after expiration of the transmission prohibition time to transmit a second transmission packet, using a free resource within the second resource range; and
  searching for free resources in the second resource range before the transmission prohibition time expires in a case where a type of the first transmission packet requires real-time property.

* * * * *